United States Patent [19]
Mukainakano

[11] Patent Number: 6,111,388
[45] Date of Patent: Aug. 29, 2000

[54] CHARGE AND DISCHARGE CONTROL CIRCUIT

[75] Inventor: Hiroshi Mukainakano, Chiba, Japan

[73] Assignee: Seiko Instruments Inc., Japan

[21] Appl. No.: 09/023,963

[22] Filed: Feb. 13, 1998

[30] Foreign Application Priority Data

Feb. 14, 1997 [JP] Japan ................................ 9-030793

[51] Int. Cl.[7] .................................................. H01M 10/46
[52] U.S. Cl. ................................... 320/134; 320/136
[58] Field of Search .................................. 320/110, 118,
320/123, 128, 132, 134, 136, FOR 114,
FOR 120, FOR 129, FOR 138, FOR 148

[56] References Cited

U.S. PATENT DOCUMENTS

| | | | |
|---|---|---|---|
| 5,493,197 | 2/1996 | Eguchi et al. | 320/134 X |
| 5,547,775 | 8/1996 | Eguchi et al. | 320/118 |
| 5,583,415 | 12/1996 | Fernandez et al. | 320/121 |
| 5,742,148 | 4/1998 | Sudo et al. | 320/134 |

*Primary Examiner*—Edward H. Tso
*Attorney, Agent, or Firm*—Adams & Wilks

[57] ABSTRACT

A charge/discharge control circuit is provided which prevents an abnormally high charging voltage from damaging a secondary cell. The charge/discharge control circuit has an overcharge detecting circuit for detecting whether the secondary cell is in an overcharged state by comparing a divided output voltage of the secondary cell with a reference voltage, a delay circuit for outputting a delayed version of an output of the overcharge detecting circuit delayed by a predetermined delay time, and a high voltage detecting circuit for detecting whether the secondary cell is in a high voltage supplying state by detecting whether a voltage of the secondary cell is more than a predetermined level higher than the overcharge detecting voltage detected by the overcharge detecting circuit. The switch circuit is turned OFF to stop charging of the secondary cell when either the overcharge state or the high voltage supplying state is detected in response to outputs of the delay circuit and the high voltage detecting circuit.

1 Claim, 3 Drawing Sheets

CHARGE AND DISCHARGE CONTROL CIRCUIT

The present invention relates to a charge and discharge control circuit controlling charge and discharge of a secondary cell by controlling the ON/OFF state of a switch circuit.

A charge and discharge control circuit has been disclosed in the prior art, in which a switch circuit is connected to a secondary cell in series and is controlled by ON/OFF control to control the charge and discharge of the secondary cell thereby. For example, in controlling charge and discharge of a lithium ion cell, whether the terminal voltage of the lithium ion cell is more than the predetermined level is detected by comparing its voltage with a reference voltage by a comparator. When it is detected that the terminal voltage is more than the predetermined reference level, the switch element of the switch circuit is turned OFF so as to stop charging of the cell. The above construction has been introduced in general. As the result, overcharge state is detected and charge to the secondary cell is controlled so that the secondary cell does not become in an overcharge state not responding to the transient change of cell voltage.

However, in the above-described construction, as a delay circuit operates before the secondary cell is disconnected so that even when higher voltage than the overcharge detecting voltage is supplied for some reason, the secondary cell, has a high voltage supplied until the predetermined delay time passes. This is very dangerous for the cell and causes shortening of the cell life. Although a capacitor is formed for setting delay time in the delay circuit, when wrong capacitance of a capacitor or pin shorting occurs, the overcharge detecting circuit does not operate normally and becomes in an overcharge state. That causes damage of the secondary cell even when high voltage is not supplied from outside.

An object of the present invention therefore is to provide a charge and discharge control circuit preventing high voltage from being supplied by all kinds of reasons.

SUMMARY OF THE INVENTION

To solve the above problems, the charge and discharge control circuit of the present invention controls a charge and discharge of a secondary cell connected to an external power source terminal through a switch circuit by ON/OFF controlling the switch circuit. The charge and discharge control circuit further comprises an overcharge detecting circuit for detecting whether the secondary cell is in the overcharge state, a delay circuit for outputting a delayed output from the overcharge detecting circuit by a predetermined delay time, and a high voltage supplying state by detecting circuit for detecting whether a voltage of a predetermined level higher than the overcharge detecting voltage detected by said overcharge detecting circuit is being supplied to the high voltage supplying state supplied by said secondary cell, wherein the switch circuit is turned OFF so as to stop charging of the cell when at least either the overcharge state or the high voltage supplying state is detected responding to the delay circuit and the high voltage detecting circuit.

According to the above-described construction, when a voltage at a predetermined level higher than the overcharge detecting voltage is rapidly supplied for some reason, the high voltage detecting circuit detects it and turns off the switch circuit instantly, and the high voltage detecting circuit thus prevents high voltage from being supplied to the secondary cell without waiting for the output of the overcharge detecting circuit to be obtained through the delay circuit. Even when the terminal voltage of the secondary cell rises and exceeds the high level of the above-described predetermined level, the high voltage detecting circuit operates to stop the switch circuit to prevent further charging of the cell, and prevents high voltage from being supplied to the secondary cell.

DETAILED DESCRIPTION OF THE PREFERRED EMBODIMENTS

Referring figures, an embodiment of the present invention will be described below in detail.

Figure 1:
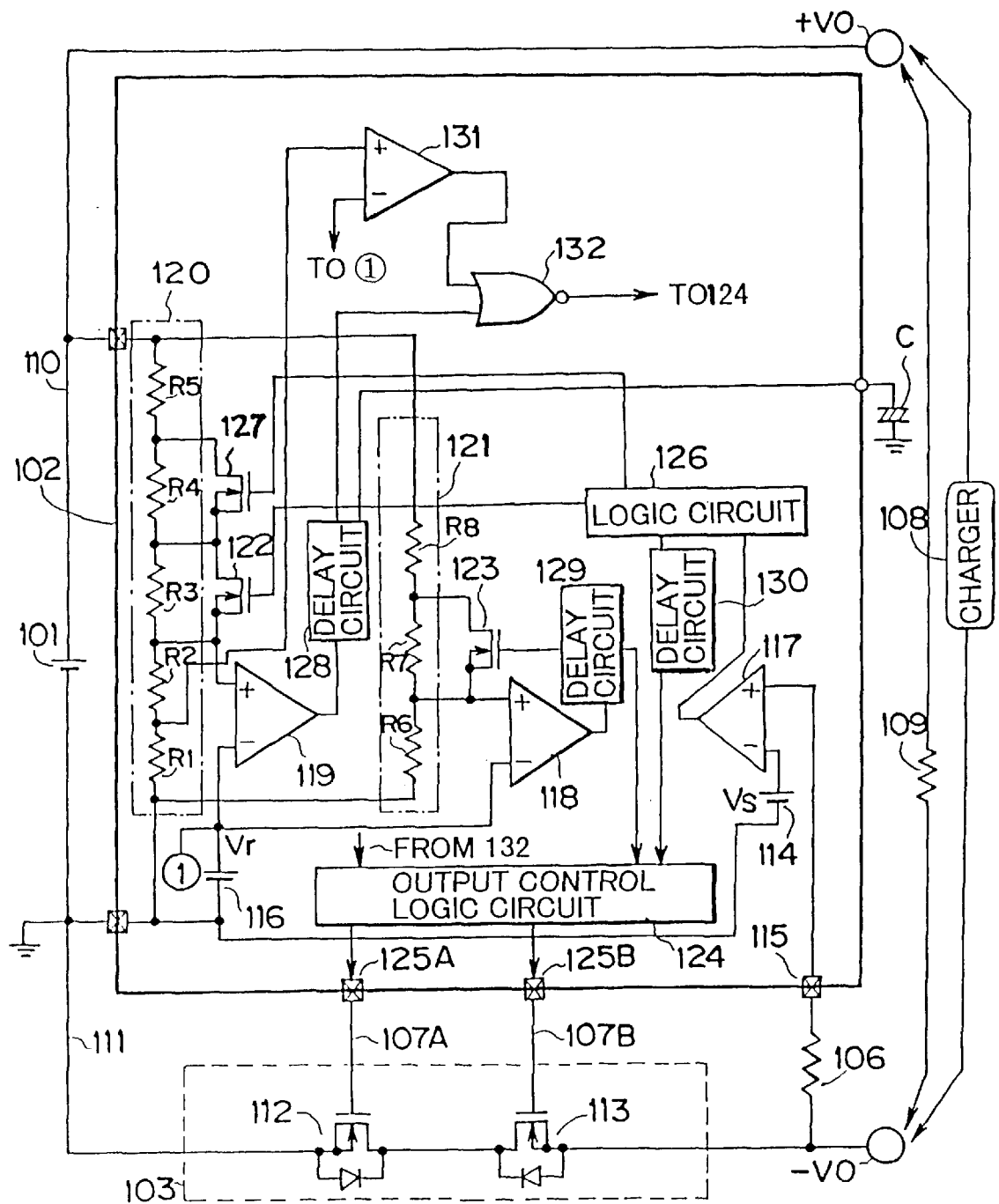
FIG. 1 is a circuit diagram showing an embodiment of a charge and discharge control circuit of the present invention.

FIG. 1 is a circuit block diagram of a charge and discharge control circuit of the present invention. A negative pole of a secondary cell 101 is connected to an external power source terminal −V0 through a switch circuit 103. The switch circuit 103 comprises two N-channel FETs, in the embodiment shown in the figure, a first FET 112 for overdischarge control and overcurrent control is connected to at the secondary cell 101, and a second FET 113 for overcharge control is connected to at the external power source terminal −V0. Voltage of the secondary cell 101 is detected by a charge and discharge control circuit 102 as described below, and the ON/OFF state of the FETs 112 and 113 is controlled depending on the result detected. The charge and discharge control circuit 102 includes an overcharge detecting comparator 119, an overdischarge detecting comparator 118, a reference voltage circuit 116 for supplying predetermined reference voltage Vr to each minus input terminal of the overcharge detecting comparator 119 and the overdischarge detecting comparator 118, a first voltage divider circuit 120 comprising resistors R1 to R5 for dividing the terminal voltage of the secondary cell 101, a second voltage divider circuit 121 comprising resistors R6 to R8 for dividing the terminal voltage of the secondary cell 101, and an output control logic circuit 124.

Two outputs from the output control logic circuit are connected to terminals 125A and 125B respectively, and to each gate of the FETs 112 and 113 of the switch circuit 103 with signal lines 107A and 107B. An ON/OFF control signal is sent from the output control logic circuit 124 to the FETs 112 and 113. A charger 108 for charging the secondary cell 101 and a load 109 driven by the secondary cell 101 are connected between the external power source terminals +V0 and −V0.

The overcharge detecting comparator 119 has a function of detecting an overcharge state by comparing reference voltage Vr of the reference voltage circuit 116 with the divided output reflecting the terminal voltage of the secondary voltage 101 generating at both terminals of the combined resistance with the resistors R1 and R2 of the voltage divider circuit 120.

In the overcharge detecting comparator 119, when the level of above-mentioned divided output voltage input to the plus input terminal thereof is more than the reference voltage Vr, the output of the comparator has a high level. A delay circuit 128 is formed at the output side of the overcharge detecting comparator 119. The delay circuit 128 is connected to a capacitor C (not illustrated) formed at the outside, and when terminal voltage of the capacitor becomes the determined value, the output of the delay circuit 128 becomes high in level. Because of this, the output of the delay circuit 128 turns to a high level from a low level a predetermined delay time when output of the overcharge detecting comparator 119 turns to a high level from a low level. Output of the delay circuit 128 is constructed so as to be input to an output control logic circuit 124 through a NOR circuit 132, and the output control logic circuit 124 turns the FET 113 OFF when the output of the delay circuit 128 turns to a high level from a low level.

An FET shown with symbol 122 has a function to turn ON to short the resistor R3 when the output of the delay circuit 128 becomes high in level, to make the level of the plus input terminal of the overcharge detecting comparator 119 high, and to impart operation of the overcharge detecting comparator 119 with hysteresis. The ON/OFF state of the FET 122 is controlled responding to output of the delay circuit 128.

In this manner, the overcharge detecting comparator 119 has a construction to turn the FET 113 OFF and to prevent high voltage from supplying to the secondary cell 101. Because the delay circuit 128 is formed at output side thereof, the comparator turns the FET 113 OFF and can stop the supply of high voltage to the secondary cell 101 without stopping the charge on each occasion of a transient high voltage supply, and only when the overcharge state lasts at least the predetermined delay time.

However, when a high voltage which is likely to damage the secondary cell 101 is rapidly supplied to the secondary cell 101, high voltage is supplied to the secondary cell 101 before the FET 113 is turned OFF by the operation of the delay circuit 128. Therefore, as the supply of high voltage to the secondary cell 101 does not stop instantly, the secondary cell 101 may break, and life thereof is shortened.

To prevent such condition, a high voltage detecting comparator 131 is formed, which compares the voltage across the terminals of the resistor R1 with the reference voltage Vr and distinguishes whether a higher voltage than the predetermined level at which damage is caused to the secondary cell 101 is supplied to the secondary cell 101. The reference voltage Vr is supplied to the minus input terminal of the high voltage detecting comparator 131 and the voltage across the terminals of the resistor R1 is supplied to the plus input terminal. Therefore, when the voltage between the terminals of the resistor R1 is more than the reference voltage Vr, the output of the high voltage detecting comparator 131 becomes high in level. Output of the high voltage detecting comparator 131 and the output of the delay circuit 128 are input to the NOR circuit 132, and the output of the NOR circuit 132 becomes high level when either of the two inputs becomes high in level. Output of the NOR circuit 132 is input to the output control logic circuit 124, and when the output of the NOR circuit 132 becomes high in level, the FET 113 is turned OFF by the output control logic circuit 124.

In this manner, when the secondary cell 101 is distinguished to be in the overcharge state by cooperation of the overcharge detecting comparator 119 and the delay circuit 128, the FET 113 is turned OFF. When it is distinguished that a higher voltage level than the overcharge detecting level is supplied to the secondary cell 101, the FET 113 is turned OFF instantly so as to protect the secondary cell 101 effectively from high voltage. Even when the overcharge protect operation can not be performed due to malfunction of the overcharge detecting comparator 119 or the delay circuit 128, the secondary cell 101 is protected from overcharging by the high voltage protect function of the high voltage detecting comparator 131. In other words, the high voltage detecting comparator 131 has the function of a backup means of overcharge detecting by the overcharge detecting comparator 119 and the delay circuit 128.

An overdischarge detecting comparator 118 has a function of comparing reference voltage Vr of the reference voltage circuit 116 with a divided output voltage reflecting the terminal voltage of the secondary cell 101 generating across both terminals of a resistor R6 of voltage divider circuit 121 and detecting the overdischarge state.

Output of the overdischarge detecting comparator 118 becomes high in level when a level of the above-mentioned divided output voltage input to the plus input terminal of the overcharge detecting comparator 118 is more than the reference voltage Vr. A delay circuit 129 is formed at the output side of the overdischarge detecting comparator 118, and the output of the delay circuit 129 changes from a low level to a high level a predetermined delay time after the output of the overdischarge detecting comparator 118 changes to high level from a low level. Responding to the output of the delay circuit 129 charging from low level to high level, the output control logic circuit 124 turns the FET 112 OFF to stop the discharge operation of the secondary cell 101. As the detailed circuit is well known, which turns the FET 112 OFF when output of the over discharge detecting comparator 118 becomes high in level, the description in FIG. 1 will be omitted. An FET shown with symbol 123 has a function to turn ON to short the resistor R7 when the output of the delay circuit 129 becomes high in level, to make the level of the plus input terminal of the overdischarge detecting comparator 118 high, and to impart operation of the overdischarge detecting comparator 118 with hysteresis.

An overcurrent detecting comparator shown with symbol 117 detects whether overcurrent flows through the load responding to voltage of the external power source terminal −Vo obtained through a terminal 115. The plus input terminal of the overcurrent detecting comparator 117 is connected to a terminal 115 of the charge and discharge control circuit 102, a reference voltage circuit 114 is connected to a minus terminal thereof, and the reference voltage circuit 114 supplies the predetermined constant reference voltage Vs to the minus terminal of the overcurrent detecting comparator 117.

The overcurrent detecting operation by the overcurrent detecting comparator 117 operates as follows. When current flowing from the secondary cell 101 to the load 109 increases and becomes the overcurrent state, voltage drop occurring at the switch circuit 103 increases, voltage level supplied to the plus input terminal of the overcurrent detecting comparator 117 becomes more than the reference voltage Vs supplied to the minus terminal thereof, and the output of the overcurrent detecting comparator 117 becomes a high level state. The output of the overcurrent detecting comparator 117 is input to a output control logic circuit 126, here, the predetermined logic process is carried out between output from the delay circuit 128 and output of the overcurrent detecting comparator 117, and a signal of high level from the output control logic circuit 126 is output to the delay circuit 130 under the predetermined condition. Because of this, output of the delay circuit 130 becomes a high level state after a predetermined time, and the FET is turned OFF by the output control logic circuit 124. As the result, current flowing from the secondary cell 101 to the load 109 stops, and overcurrent state dissolves.

Although operations of the overcharge detecting comparator 119, the overdischarge detecting comparator 118, and the overcurrent detecting comparator 119 have hysteresis using combined circuits between the voltage divider circuits 120 and 121, and the FETs 122, 123, and 127 in the embodiment shown in FIG. 1, the construction of the present invention is not limited to this example, and the hysteresis operation may, of course, be realized by another prior circuit.

In the embodiment shown in FIG. 1, an example of construction for charge and discharge controlling only one secondary cell 101 is described. However, the present invention is not defined only in charge and discharge controlling one secondary cell, and can be applied similarly for charge and discharge controlling a plural of secondary cells.

Figure 2:
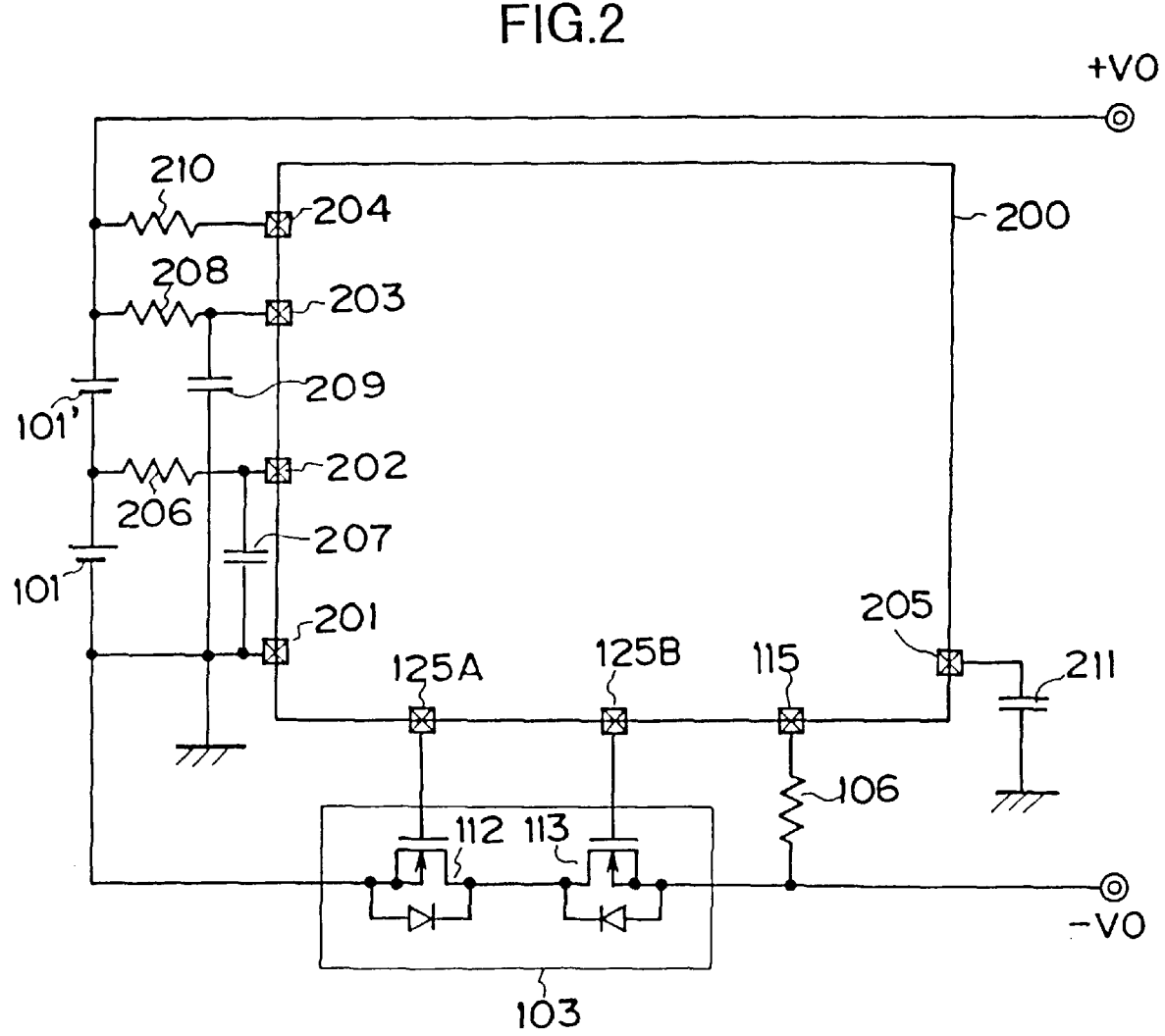
FIG. 2 is a circuit diagram showing an embodiment of a charge and discharge control circuit of the present invention applying to a circuit for two cells.

An embodiment of the present invention applied for a charge and discharge control circuit for two cells is shown in FIG. 2. The charge and discharge control circuit shown in FIG. 2 is a circuit for carrying out charge and discharge controlling of another secondary cell 101' adding the secondary cell 101 similarly as the case of FIG. 1. In the charge and discharge control circuit, the secondary cells 101 and 101', resistors 206, 208, and 210, and capacitors 207, 209, and 211 are connected to terminals 201 to 205 of the charge and discharge control circuit 200 shown in FIG. 2. In each portion of FIG. 2, description of portions corresponding to each portion of FIG. 1 is omitted labeling the same symbols.

Figure 3:
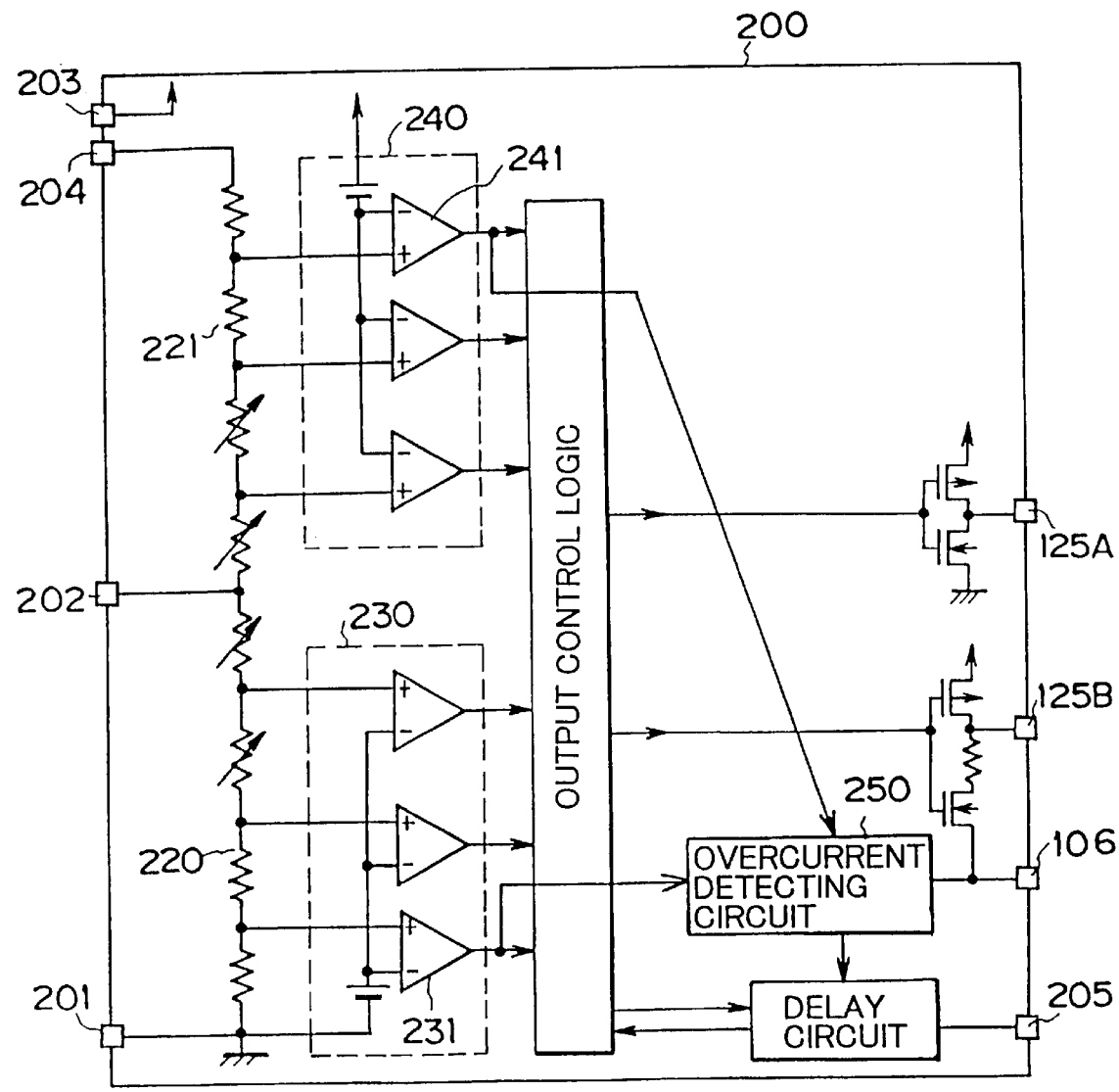
FIG. 3 is a main circuit diagram showing a construction of the charge and discharge control circuit shown in FIG. 2.

A rough construction of the charge and discharge control circuit 200 is shown in FIG. 3. The charge and discharge control circuit 200 has a first voltage divider circuit 220 for dividing voltage of the secondary cell 101 and a second voltage divider circuit 221 for dividing the voltage of the secondary cell 101'. A first comparator circuit 230 for charge and discharge, and overcurrent control of the secondary cell 101 operates by output of the first voltage divider circuit 220. A second comparator circuit 240 for charge and discharge, and overcurrent control of the secondary cell 101' operates by output of the second voltage divider circuit 221. Output of an overcharge detecting comparator 231 of first comparator circuit 230 and output of an overcharge detecting comparator 241 of second comparator circuit 240 are supplied to an overcurrent detecting circuit 250. When overcharge is detected at either output of the overcharge detecting comparator 231 or the overcharge detecting comparator 241, threshold level for overcurrent detecting at the overcurrent detecting circuit 250 is made high. Because of this, even if passing current flows through a resistor 106, malfunction of the overcurrent detecting circuit 250 is prevented efficiently.

According to the present invention, in the charge and discharge control circuit constructed so as to stop charge from being applied to the secondary cell with a predetermined delay time after the overcharge state is detected, when high voltage is supplied to the secondary cell, which is likely to damage the secondary cell, the voltage is detected and current flowing to the secondary cell can be stopped without delay time. Therefore, the secondary cell is protected from high voltage. As a bad capacitance in the capacitor of the delay circuit for overcharge control can be supported, the protection of the secondary cell is carried out more surely than the past.

What is claimed is:

1. A charge and discharge control circuit for controlling the charging and discharging of a secondary cell connected to an external power source terminal through a switch circuit by ON/OFF controlling the switch circuit, comprising:

an overcharge detecting circuit for detecting whether the secondary cell is in an overcharged state by comparing a divided output voltage of the secondary cell with a reference voltage;

a delay circuit for outputting a delayed version of an output of the overcharge detecting circuit delayed by a predetermined delay time; and a high voltage detecting circuit for detecting whether the secondary cell is in a high voltage supplying state by detecting whether a voltage of the secondary cell is more than a predetermined level higher than the overcharge detecting voltage detected by the overcharge detecting circuit;

wherein the switch circuit is turned OFF to stop charging of the secondary cell when either the overcharge state or the high voltage supplying state is detected in response to outputs of the delay circuit and the high voltage detecting circuit.

* * * * *